(12) United States Patent
Thepsimuang et al.

(10) Patent No.: US 8,562,883 B2
(45) Date of Patent: Oct. 22, 2013

(54) APPARATUS AND METHOD FOR PELLETIZING WAX AND WAX-LIKE MATERIALS

(75) Inventors: Boonlert Thepsimuang, Daleville, VA (US); J. Wayne Martin, Buchanan, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 704 days.

(21) Appl. No.: 12/224,790

(22) PCT Filed: Mar. 8, 2007

(86) PCT No.: PCT/US2007/005945
§ 371 (c)(1),
(2), (4) Date: Jul. 30, 2010

(87) PCT Pub. No.: WO2007/103509
PCT Pub. Date: Sep. 13, 2007

(65) Prior Publication Data
US 2010/0289170 A1    Nov. 18, 2010

Related U.S. Application Data

(60) Provisional application No. 60/780,348, filed on Mar. 9, 2006.

(51) Int. Cl.
*B29B 9/06*  (2006.01)
(52) U.S. Cl.
USPC .......................................................... 264/142

(58) Field of Classification Search
USPC .......................................................... 264/142
See application file for complete search history.

(56) References Cited

U.S. PATENT DOCUMENTS

| 2,216,188 | A | 10/1940 | Dons et al. |
| 3,288,892 | A | 11/1966 | Bewley et al. |
| 5,942,170 | A | 8/1999 | Peitz |
| 7,118,362 | B2 | 10/2006 | Lee et al. |
| 2003/0000100 | A1 | 1/2003 | Ludwig et al. |
| 2004/0009254 | A1 | 1/2004 | Eloo et al. |
| 2005/0056961 | A1 | 3/2005 | Bonner |

FOREIGN PATENT DOCUMENTS

| DE | 32 47 406 | 6/1984 |
| WO | WO 2007/064580 | 6/2007 |
| WO | WO 2007/123931 | 11/2007 |

*Primary Examiner* — Larry Thrower
(74) *Attorney, Agent, or Firm* — Jacobson Holman PLLC (57) ABSTRACT

An apparatus and method for the pelletization of waxes, wax-like and other materials having a sharp melt point include a vessel for forming the wax into a hot molten material. A heat exchanger then cools the molten wax to a temperature just above its melt temperature. The cooled liquid wax is fed to an extruder which further reduces the temperature and mixes the liquid wax into a thoroughly mixed extrudable solid wax. The solid wax is then extruded through die orifices of a die plate into a cutting chamber, and a rotary cutter cooperating with the die face of the die plate cuts the extruded solid wax strands into pellets. The die plate, cutting chamber and rotary cutter can have the same structure as an underwater pelletizer, but operating without water or liquid as a dry face pelletizer. The thus formed wax pellets drop out of the cutting chamber by gravity through an opening in the bottom thereof.

13 Claims, 7 Drawing Sheets

APPARATUS AND METHOD FOR PELLETIZING WAX AND WAX-LIKE MATERIALS

This is a national stage of PCT/US2007/005945 filed Mar. 8, 2007 and published in English, claiming benefit of U.S. provisional application No. 60/780,348, filed Mar. 9, 2006.

RELATED APPLICATION

This application is entitled to and hereby claims the Priority of co-pending U.S. provisional application Ser. No. 60/780,348, filed Mar. 9, 2006.

FIELD OF INVENTION

The present invention relates generally to an apparatus and method for the pelletization of waxes and wax-like materials. More specifically, the present invention relates to an apparatus and method for pelletizing waxes and wax-like materials by extruding the wax or like material through orifices in a die plate and cutting the extruded strands with a rotating cutter similar to an underwater pelletizer but without water, in the nature of "hot face" or "dry face" pelletizing, and with the wax or like material in a solid state.

BACKGROUND OF THE INVENTION

There are a number of common methods in wax manufacturing to get the wax into a condition or shape to package, transport and utilize and/or feed in subsequent processes, most of which likely take place at other locations. The common forms are as follows.

A) Bricks and Cakes: This form is probably the oldest process, and most elementary. Basically, the molten wax is poured into a mold of a desired shape such as circular, rectangular, etc. and let cool. The disadvantages to this method of manufacture include risk of spillage and splash on operators, long periods of storage and much space to cool, risk of contamination during pouring and generally such technique is very labor intensive. Later when using these bricks or cakes, the total mass is great and thus takes melt pots and time to re-melt the wax. Adding more bricks to an existing container partly full of liquid wax also increases risk of splash to operators. Dosing and conveying methods are not very sophisticated.

B) Prills: Prilling involves very tall towers (and thus buildings) with long insulated pipe runs, which basically utilize certain atomizing spray nozzles. The sprayed wax generally free falls in a cross-current of cooled gas a distance necessary to cool the wax droplets to a solid state. Depending on the wax and how things are adjusted, this method can yield fine particles like powder-to-small beads-to-pellets close to 2 to 3 mm in size. This process tends to work well with optimal flexibility when the waxes are of the lowest viscosity types. However, as the viscosities increase there is a challenge to get the spray concept to work, as the wax would prefer to pour as a solid stream or string. Further, since these towers are quite tall, considerable space (in height and volume) and construction work are required. Furthermore, gas cooling is not the most efficient way to process polymers. Thus, considerable energy is required to do the cooling and gas circulation functions, plus there is the large amount of construction insulation required for such large facilities and especially in locations where the ambient temperatures are quite high.

C) Slats & Chips: This form is a result of pumping and/or extruding the molten wax as continuous strand(s) onto a belt, usually a steel belt, on which the heat energy is absorbed by the belt from the wax until the wax has solidified. At the end of the belt the wax strand or strip (as the strand tends to flatten out) is feed into a cutter, thus shearing the strips into slats or chips. The disadvantage here again is inefficiency. As the strand falls upon the belt, the contact surface promptly cools/solidifies. But this forms a boundary layer that tends to insulate the remainder of the wax above it. Thus the cooling process slows down as the wax stays on the belt without any agitation or cooling surface removal/renewal. As a result the steel belts which must be of a polished finish (like a mirror) can get very long and wide to have any appreciable rate of production. These precision polished belts can be very expensive and are quite susceptible to damage, and require tremendous cooling support units. The belts can take up much floor space and in the event of rate increase (or viscosity increase), need greater and greater lengths requiring aisles to be changed in plant layout or worse. In regard to wax grades with higher and higher viscosities, they tend to require the existing belt lines to significantly slow down, so as to increase exposure to cooling time, thus resulting in considerable loss in production output. In addition, during humid seasons or in places where humidity is high, the very cold steel belts can suffer condensation build up, thus making the waxes wet (and there is usually no drying capability). To compensate, an expensive cover could be installed over and around the belt process. But this too, must be climate controlled. And without such a cover, the product is exposed to dust, insects and other contaminates, to be imbedded in the still molten waxes. There is also increased exposure to oxidation at the elevated temperature with or without the cover.

D) Pastilles: This process also utilizes a steel belt principle. As such, many of the disadvantages are the same as described above for the "slats & chips" method. One significant difference is the final wax product shape which is more like a pellet or lens shape, and the final product tends to be very uniform. Conversely, this process, which uses the principle of dropping "droplets" of wax onto the belt, is even more limited when approaching higher viscosity grades where the wax product would rather pour onto the belt instead of dripping onto the belt. Thus, this process tends to be limited to the low end viscosity range. Further "pastille" sizes can be very limited; meaning it gets less efficient and practical for the belt process to make "micro-pellet" sizes.

E) Pellets & Powder: Some prilling applications can produce "near powder" sizes or make near pellet sizes (like 2 to 3 mm) which can then be ground into powder. Some waxes are of a high enough viscosity, also having enough melt strength and a wide enough liquid to solid state temperature range to be suitably pelletized, such as by means of an underwater pelletizing process. For such wax grades, they can be sold either in pellet form (such approximately 3 mm in diameter) or can be ground into a fine powder form.

However, efforts to pelletize waxes using underwater pelletizer and centrifugal dryer equipment has attained mixed results and, in many cases, the underwater pelletizing methodology has produced unsuccessful results. Most waxes have very low liquid-to-solid temperature points, relative to the many resins, polymers, plastics, and elastomer type materials and their compounds that can be pelletized with underwater pelletizing technology. What is the basic problem for underwater pelletizing of waxes is the fact that many of these waxes go from an extremely low viscosity (much lower than normally observed in the other above mentioned polymers) to become a solid within a very narrow range of temperature, typically from about 5° C. to about 20° C. In contrast, the band or range of temperatures for many of the other polymers on which underwater pelletizing is applicable are much wider from being in a more liquid state to a more solid state. For the purposes of this application, materials having a narrow temperature range for liquid/solid state change are referred to as having a "sharp melt point".

Materials that exhibit this sharp melt point in combination with a very low melt to solid transition temperature include most waxes. These properties can cause serious problems when attempting to pelletize waxes using underwater pelletizing equipment. The leading problem is that as the wax passes through the die plate (a metal plate with a relatively concentric circle or circles of extrusion orifices), the wax will have a tendency to freeze-off within the extrusion orifices. This is caused by the fact that underwater pelletizing utilizes a water flow across the die plate face to act as a quenching medium for the extruded strands exiting from the die orifices, and as a conveying means once the strands are cut into pellets at the orifice exit point by the rotating blades of the pelletizer cutter.

This freeze-off or freezing occurs because the water flowing across the die face is of a normally much lower temperature than the liquid or melt temperature of the wax extrudate. Thus, as the wax strand passes through the die extrusion orifice, the strand loses much of its remaining internal heat energy into the surrounding die extrusion orifice wall as it approaches the exit. And because of its sharp melt point, the wax transitions very quickly into a solid state before exiting the orifice thus creating a blockage in that orifice. As a result the back pressure forcing the wax into and through the die orifices increases and velocity through any remaining open flowing orifices also increases. Other orifices can continue to freeze and block until some sort of equilibrium velocity and back pressure are achieved, so to generally keep any remaining unblocked holes open. This situation is very unpredictable for the pelletizing process, and yields non-uniform size pellets. Thus the process is very unstable to continue.

Furthermore, increasing back pressure causes slipping within the upstream pumping equipment, which can occur easily because of the very low viscosities of the wax in the molten/liquid state. The loss of rate from the pump to the die further complicates the issue of reaching an equilibrium state, and thus further adds instability to the process. Additionally, the pumping equipment while working to create pressure and flow of the wax, while suffering slip, will add more energy into the wax, thus driving the already low viscosity, even lower, making it even more difficult to establish a stable running system with predictable pelletizing results.

Yet another problem associated with pelletizing waxes is that a common property of most waxes, unlike many of the polymers/plastics on which underwater pelletizers work well, is they have a very low "melt strength". For the purposes of this application, the term "melt strength" is intended to define the ability of the material to stay together upon the impact of the cutting blades at high speed, to shear the polymer or wax strand as it exits the die orifice. In other words, as the strand is cooling from the influence of the process water the pellet is gaining in strength to hold itself together to be formed into a pellet.

In the case of many waxes, the melt strength is nearly non-existent, and as the liquid or semi-liquid wax strand exits the die orifice, the impact of the cutter blade trying to shear the strand into a pellet actually causes an impact explosion or shattering of the pellet into many fragments. This effect produces a wax solid geometry more like shredded coconut or like fines and/or a combination of the two.

Even if shredded coconut or fines-type particles might be acceptable, there remain the problem of how to get such wax particles separated from the water and dry. Standard centrifugal dryers that typically support the underwater pelletizer cannot be used effectively. For example, with many grades of wax where suitable/normal pellet geometry could be achieved with an underwater pelletizer, such as a 3 mm diameter cylinder, lens or sphere, these wax pellets could be brittle entering the centrifugal dryer at the colder process water temperatures, thus breaking the pellets causing waste in fines or dust. Conversely, if the water temperature is warmed to reduce breakage, the higher temperature causes the pellets to be softened and more likely to scrape off particles from the wax pellet surfaces as they pass through the dryer, thus still producing fines and dust.

Another problematic issue associated with using a centrifugal type dryer can be the pellet deformation effects inside of the dryer. This could be an issue whenever the deformation temperature of the material is below the actual temperature of the material at the time it passes into and through the centrifugal dryer. The most common problem observed is the material getting embedded onto or into the dryer rotor screens which leads to the screens getting plugged over time with the materials. This embedding and/or plugging reduces or eventually eliminates the ability of the dryer to get the material dry enough for subsequent packaging, storing or processing.

SUMMARY OF THE INVENTION

During experimental work, another property or characteristic of waxes was observed. Specifically, upon transitioning from a distinct liquid to a distinct solid, the solid wax was still very malleable. Although it would not flow in the sense of a liquid nor would it easily stick back together, it could easily be "cold-worked" into another shape and would normally retain that shape. As used herein, the term "cold-worked" means any form of mechanical deformation processing carried out on a plastic or polymer material below its melt temperature. It was also apparent that the malleability or cold-workability increased as the solid temperature was higher and conversely the malleability reduced as the solid temperature was reduced. Furthermore, it was found that waxes could be extruded through conventional underwater pelletizer die plates quite easily as a solid wax material, rather than as a conventional liquid or molten material. In fact, the solid wax material as extruded through the die orifices formed good strands that did not fuse easily back together, at least not under their own weight.

In view of the foregoing, the equipment upstream of the die plate is therefore modified to take the hot liquid wax from a reactor or mixing vessel, or whatever is used to produce or melt and/or blend the wax, and then to cool the wax down to a solid state as efficiently as possible. Then with the wax in a solid but very malleable condition, it can be pressurized to go through the die plate in that same solid state. In accordance with the present invention, the malleable condition of the solid state wax permits a high plastic deformation of the malleable material in compression without fracture. On the pelletizer side of the die plate, with the wax already in a solid state, the quenching effect of the water is no longer needed. Thus, the underwater pelletizer is converted to a "dry face" pelletizer. The cutter blades on the rotating cutter hub shear the now solid strands as they exit from the die plate extrusion holes, but there is no need for simultaneous cooling/quenching with water. Furthermore, in the solid state, the wax has sufficient melt strength not to shatter apart as the cutter blades impact it. Typical underwater pelletizer equipment useful in the present invention is illustrated in U.S. Pat. Nos. 5,059,103 and 7,033,152, also owned by the assignee of this application, the disclosures of which patents are expressly incorporated herein by reference as if fully set forth.

Since the water process is no longer used, the pellets simply fall downward by gravity, through a bottom opening in the cutting chamber, after being cut by the rotary cutter. When falling out of the cutting chamber, the wax pellets preferably fall onto a conveyor, such as a belt or pneumatic type, to transport the pellets away from the pelletizing equipment, to a pellet screener, cooler and/or packaging unit.

Again, since no water for quenching is required, then the water circulation/filtration and water temperature control system are no longer required. Also the dewatering and drying equipment is not required, thus a significant number of advantages can be realized. For example, these advantages include:

Less capital equipment cost for the pelletizing system;
Reduced energy consumption by the pelletizing system;
Less floor space required for the pelletizing system;
Since water is no longer involved, issues about the consumption of and environmental concerns from the draining of the process water are no longer a consideration;
Again, since no water is involved, issues about dewatering and achieving a desired pellet surface moisture level are no longer a concern; and
Plant installation of the pelletizing system is less complex.

On the pelletizer and die plate equipment itself, more advantages are realized, such as:

The number and/or size of the die holes can be increased and the "rate per hole" decreased so that back pressures can be better controlled or further reduced. In an underwater process it is normally important to maintain a high rate or velocity per hole in order to minimize the risk of die freeze-off. This is no longer a concern in the process in accordance with the present invention.
A smaller pelletization motor can be used and/or less energy will be consumed by the pelletizer motor. A significant portion of the amp load of an underwater pelletizer motor is required to just rotate the cutter blades in the water. Conversely the act of just spinning the cutter blades in the air requires a minimum amount of energy.
Nice normal size wax pellets with 2-3 mm diameter can be easily produced. Even micro-pellets, such as about 1 mm in diameter, can be produced more reliably and predictably.

DETAILED DESCRIPTION OF PREFERRED EMBODIMENTS

Although preferred embodiments of the invention are explained in detail, it is to be understood that other embodiments are possible. Accordingly, it is not intended that the invention is to be limited in its scope to the details of construction, and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose. Where possible, components of the drawings that are alike are identified by the same reference numbers.

Figure 1:
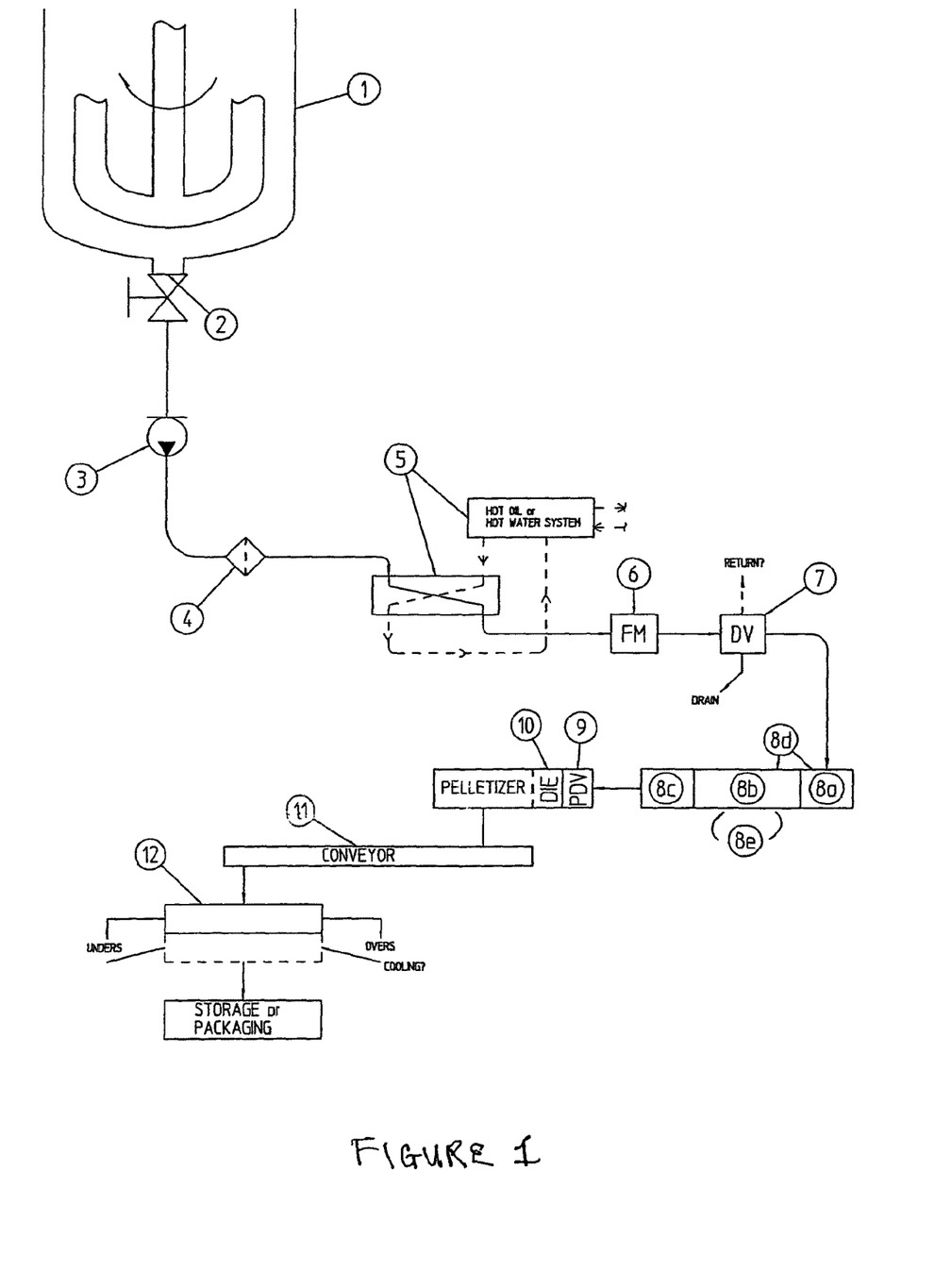
FIG. 1 is a schematic illustration of one embodiment of equipment for carrying out the wax pelletizing process of the present invention.

Turning to FIG. 1, there is schematically illustrated the equipment components for carrying out the wax pelletizing process of the present invention. Each of the components of the equipment as used in accordance with the present invention is discussed hereinafter where like numerals refer to like components in FIG. 1.

The upstream equipment, such as a reactor, mixing vessel or some kind of melting/blending type machinery for forming hot melted wax is designated by numeral 1. At the discharge end 2 of reactor 1, the wax is at its highest melt temperature and lowest viscosity, and is in a very liquid state. A low viscosity pump 3 creates enough pressure and flow to get the wax through any necessary filtration element 4, first stage cooler 5 and on into the beginning of the second stage cooler 8, or diverted off to another wax handling process or to be returned back to the vessel or upstream equipment by diverter valve 7.

The first cooling stage is basically a heat exchanger of which there are many types that would qualify, including plate and frame type, coil type, scrape wall type, U-style tube type with or without static mixers, and shell and tube type with or without static mixers. The shell and tube type with static mixers is preferred for the most efficient cooling effects. The heat exchanger can be supported by a properly designed and dedicated hot oil or hot water system. Keeping in mind that the wax is entering into the heat exchanger at or near the highest temperature, and thus a most liquid state, if properly designed the heat exchanger removes most the internal heat energy down to a known temperature point just above where the wax will change state from liquid to solid. Preferably, the heat exchanger in the first stage cooler should reduce the temperature of the wax down to approximately 5° C. or less above the wax liquid to solid transition temperature so that the wax remains liquid enough to have good unobstructed flow into and through the next downstream equipment. It is intended that the heat exchanger of the first stage cooler be the most efficient cooler so that the second stage cooler has a lesser amount of cooling work to do.

An optional flow meter 6 preferably follows the first stage cooler so that flow rate adjustments can be made at the pump 3 upstream to change or optimize conditions downstream, such as at the pelletizer 10 or within the second stage cooler 8. Diverter valve 7 can have one or more outlets. Its primary outlet is to the inlet chamber of the second stage cooler 8. One or more other outlets can be to a drain container and/or serve as a dispenser connection into another process and/or into a recirculation loop line back to the upstream process origins. The diverter valve 7 is synchronized with the downstream process equipment so that it can send liquid wax into it, when ready to start-up and run or stop flow when ready to shut down, and/or serve as an emergency diverter in the event flow must abruptly stop to the downstream equipment/process.

The second stage cooler 8 is best defined in five parts. The first, inlet chamber 8a should be heat jacketed to precisely control the liquid wax temperature so as to prevent the wax from solidifying at this juncture, yet not to add any heat energy so as to have to remove it later. The inlet chamber allows for visual inspection by operators, yet keeps any unwanted dust, impurities, and ambient air that could cause degradation or contamination problems. It is also to contain level control with alarm functions to alert operators of any potential issues and/or automatically activate the upstream diverter valve 7, and/or shut down the pump 3, until service or other adjustments can be done.

Next is the cooling section 8b. As wax goes into and through this section it is exposed to cooling temperatures well below its liquid to solid transition temperature and thus well into the solid phase temperatures. The equipment cooling should be adjustable so that many various grades of wax can be run. The size and layout of the elements within the cooling section may vary for each wax application so that there is optimum exposure to the cooling surfaces, the cooled layers are moved away and interspersed with the warmer layers of wax into a relatively homogenous mixture then returned to the cooling surface for more heat energy reduction. This process is repeated over and over again down the length of the cooling equipment, all the while wiping itself clean of the "older" cooled wax to make room for incoming hot/warm "new" wax. These functions are achieved while putting an absolute minimum of work energy into the material so as to not heat the wax back up.

As the machine focus shifts from cooling and the wax is now well into its solid state, yet very "malleable", the equipment in section 8c must now focus having the optimum design to push/pressurize or pump the solid wax into and through the downstream equipment, including a pelletizer die as a minimum. At the same time, care should be taken to keep any energy input from being converted into heat that could re-melt the wax. In addition a self-cleaning feature is preferable during this part of the process, as well.

It may be desirable during this second stage cooling, which undergoes intensive mixing and re-mixing so as to keep the various layers of wax at various temperatures being interspersed into an eventual homogenous solid, yet malleable product, to add or "compound in" certain desired additives as at 8d. The additives can vary greatly, including various minerals, antioxidants, colorants, etc, other grades of waxes, master batches or concentrates in various forms, such as powders or even liquids, either preheated or not. These additives may be introduced into the process by liquid metering pumps, screw feeders, etc., and into the inlet chamber or even ahead of that, or by injecting under pressure or not, into the side and/or top of the cooler, anywhere along sections 8b and or 8c. Finally, the second stage cooler must be supported by a properly sized and reliable cooling system 8e.

In regard to the second stage cooler 8, it should have the ability to heat up as well as cool down the pressurized wax. If the machine needs to be stopped for any length of time, and the wax loses most or all of its heat energy or all of its necessary malleability to get the wax through the equipment, then the wax has to be re-heated to a liquid state or at least to a malleable condition, so as to get the process moving again. Preferably, this capability is built into each equipment component or stage of the process so as to have the ability to heat up the equipment component at least at the beginning or as necessary.

Further to the second stage cooler 8, it should be designed in overall length as well as in diameter to be sufficient enough to do the cooling of the target wax or waxes to be processed and at the rate sufficient to meet the product goals of the overall-process. The equipment currently considered suitable for the second stage cooler 8 is an extruder such as a single screw type. An extruder with two or more screws is preferred, and most preferred is a twin or two screw extruder that is co-rotating and intermeshing.

Polymer diverter valve 9 is a common component used ahead of an underwater pelletizer. It is useful, although not necessary, in the present invention to assist the extruder to get started, with a minimum of head pressure, and once running to allow the operator to inspect the wax solid and temperature condition before the wax goes on to the pelletizer. Then once the inspection deems the upstream process as stable, predictable and the wax appears of the optimum temperature and malleability, the polymer diverter valve (PDV) is then changed to send the wax flow into the die plate and pelletizer functions. If there are ever any problems or issues at the pelletizer, the die or even in the process equipment after the die, then the PDV is normally the first component activated to divert the wax flow. The operator can then make any quick necessary adjustments without shutting down the upstream parts of the process. Or, the operator may elect to shut down most or all of the upstream process parts until after any necessary adjustments, repair services, etc. can be made.

The pelletizer and die 10 have been explained herein before. The wax is now being extruded in a solid state; the dry face pelletizer with no water is employed. However, those skilled in the art will recognize that not all waxes are problems for underwater pelletizing. Furthermore, the types and amounts of additives can be of such a significant degree/level that the wax compound may attain such a higher viscosity, which might be better pelletized in a semi-solid or semi-liquid or even a liquid state, during which an underwater type pelletizer might then be preferred. Accordingly, it is contemplated in accordance with the present invention that the pelletizer 10 can be one that can easily be converted from a dry face pelletizer to an underwater pelletizer and vice-versa.

After pelletizing the wax the pellets typically can fall onto a belt conveyor 11 to be transported away. There might be cooling fans placed around the belt to aid in removing any remaining internal heat to get the pellets closer to ambient temperature before further processing or packaging. Optional to cooling fans, a refrigerated belt could be used. A further alternative to the belt conveyor (many other mechanical types can be used), is an air conveyor either using chilled/cooled air or any gas or at ambient temperatures might be used as well. Alternatively a water conveying means could also prove beneficial as well, depending on the circumstances. Water conveying would certainly be a faster cooling method if the wax and/or the wax compound pellets need to be taken to much lower final temperatures and/or done so quickly. If water is used, however, then as mentioned before there will be a need for dewatering and drying process functions immediately thereafter.

After the conveyor 11, the wax pellets can undergo a classification step 12 where certain sizes can be segregated out as acceptable or unacceptable. "Unacceptable" may refer to "unders" which may be pellets too small in diameter or fines, and "overs" which may be pellets too large or even clusters or agglomerates, all being removed to assure wax pellet quality in regard to size qualification, and before being moved on to storage, packaging or subsequent steps or process(es). In addition to classification, there may optionally be cooling by air or other gas at this stage to assure that suitable final pellet temperature is achieved.

Figure 2:
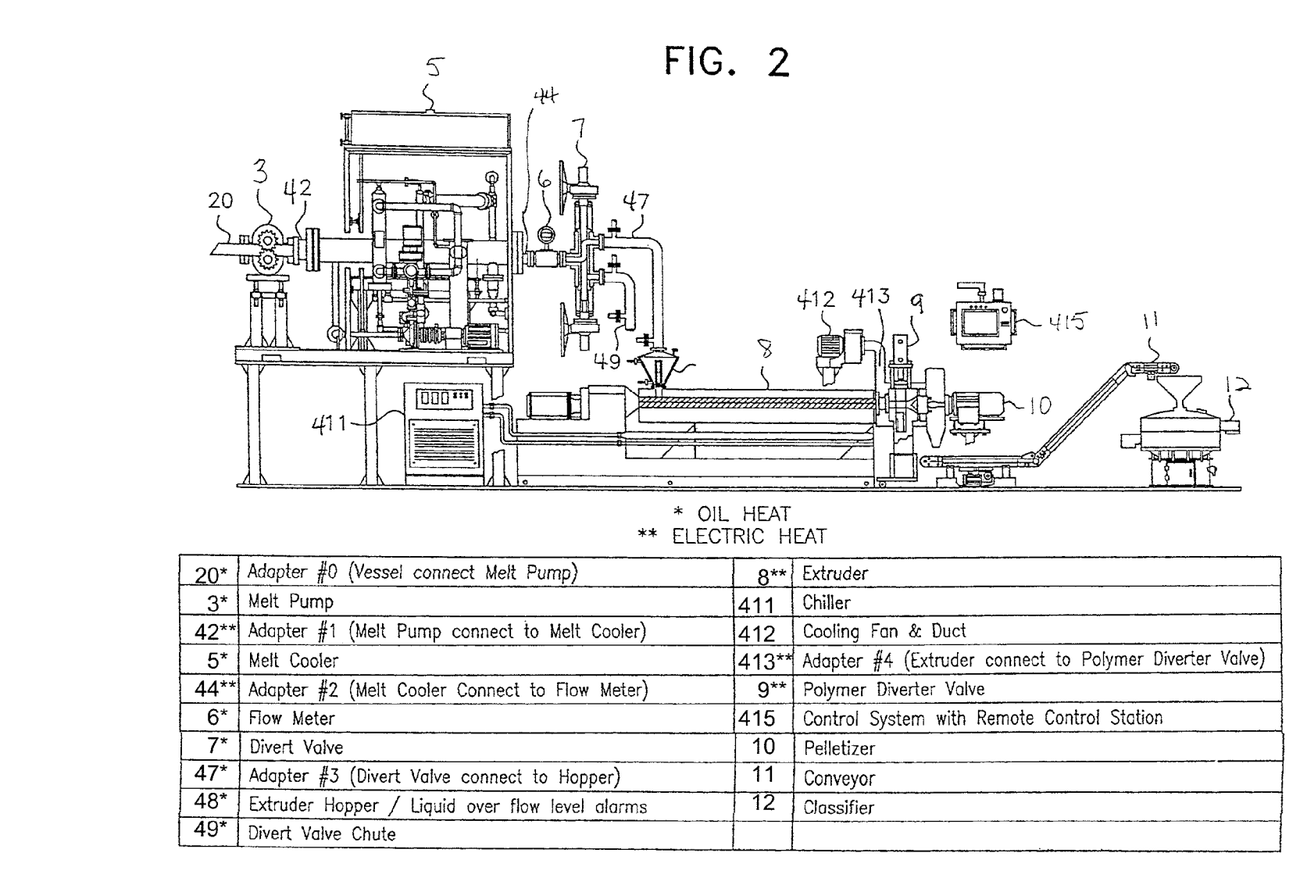
FIG. 2 is a pictorial illustration of equipment used for carrying out the wax pelletizing process of the present invention.

Turning now to FIG. 2, a pictorial illustration of equipment which might be supplied to a wax processor in accordance with the present invention is shown. Many of the equipment components illustrated in FIG. 2 are similar to those described previously in connection with FIG. 1, and further detailed description will, therefore, not be repeated. Typically, the wax reactor, mixing vessel or some other kind of melting/blending machinery for forming the hot melted wax is provided by the wax manufacturer or processor and, hence, is not illustrated in FIG. 2. Rather, the equipment illustrated in FIG. 2 starts with an adaptor 20 which connects the reactor, mixing vessel, etc. (not shown) to melt pump 3.

The melt pump 3 is connected to the melt cooler 5 through adaptor 42. The melt cooler 5 corresponds with the first stage cooler 5 of FIG. 1, and is preferably a static mixer-type heat exchanger providing for the highest cooling efficiency. Such heat exchangers are typically supported by hot oil or hot water systems, which are pictorially illustrated but not numbered separately in FIG. 2.

Following the melt cooler 5 is an adaptor 44 to connect the melt cooler 5 to the flow meter 6. Thereafter follows diverter valve 7 and adaptor 47 to connect the diverter valve to the hopper 48 of the extruder 8. The diverter valve 7 also includes diverter valve chute 49 in the event the wax is to be diverted from the extruder hopper and to a drain or recycled back to an earlier stage of the process and equipment.

The extruder 8 includes a chiller 411 to thereby cool and thoroughly mix the wax to the desired pelletizing temperature so that the wax becomes a malleable homogeneous solid at the exit end of the extruder. Adaptor 413 connects the exit end of the extruder to the polymer diverter valve 9 which then connects into the pelletizer 10. A rotary cutter (not separately numbered) cuts the extruded solid wax strands exiting the orifices of the die plate (also not separately numbered) in the cutting chamber 16a. The cut wax pellets drop from the cutting chamber of the pelletizer 10 onto conveyor 11 and then onto classifier 12. Optionally a blower and duct 412 can be attached to the cutting chamber to aid in cooling and assisting the pellets out of the chamber and on to the conveyor. The overall equipment and process illustrated in FIG. 2 is operated by a control system with remote control station 415.

It is to be noted that all of the components marked with an asterisk in FIG. 2 are provided with a heating capability, either oil heat (one asterisk (*)) or electric heat (two asterisks (**)). This heating capability is provided for the reasons explained in connection with the equipment and process of FIG. 1.

Figure 3:
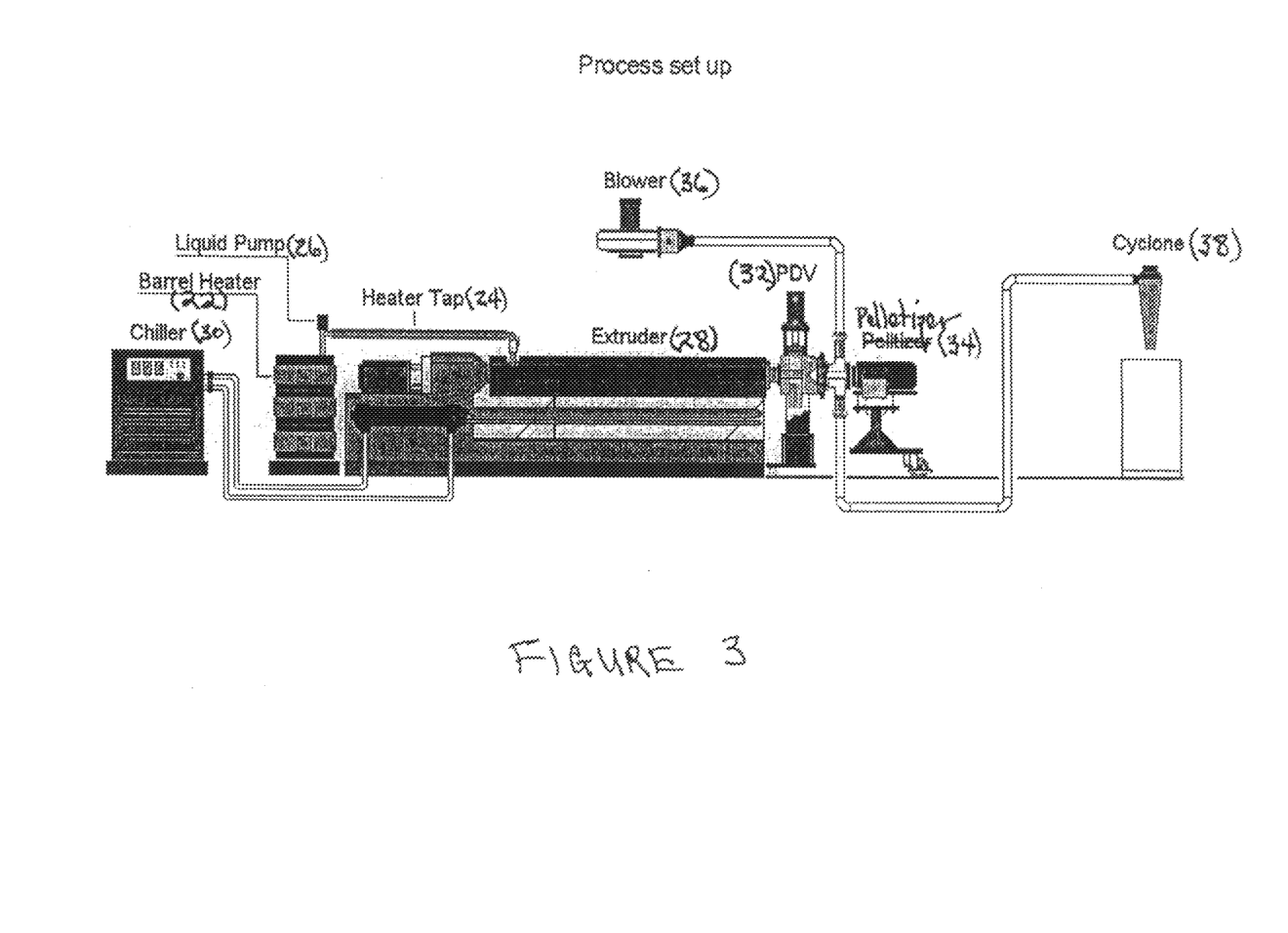
FIG. 3 is a pictorial illustration of equipment used for conducting tests of the apparatus and method of the present invention.
Figure 4A:
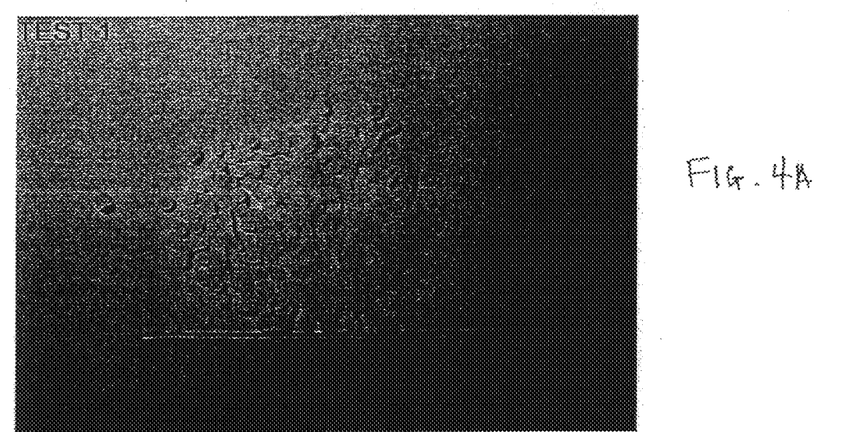
FIGS. 4A-4H are photographs illustrating product produced during tests of the apparatus and method of the present invention using the equipment illustrated in FIG. 3.
Figure 4B:
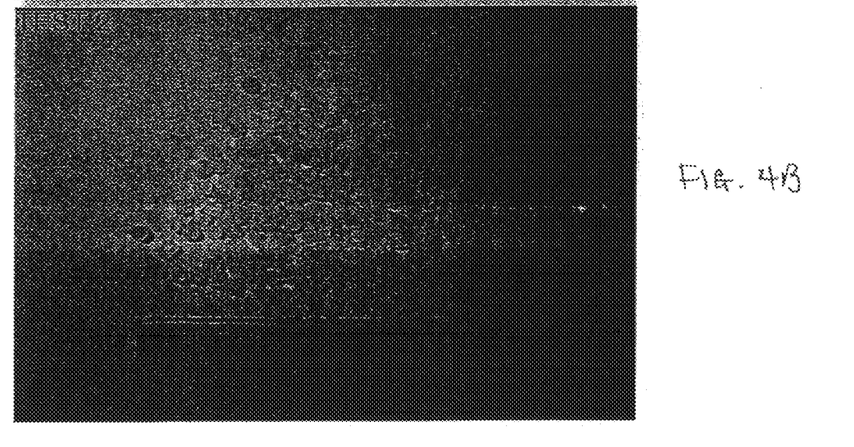
Figure 4C:
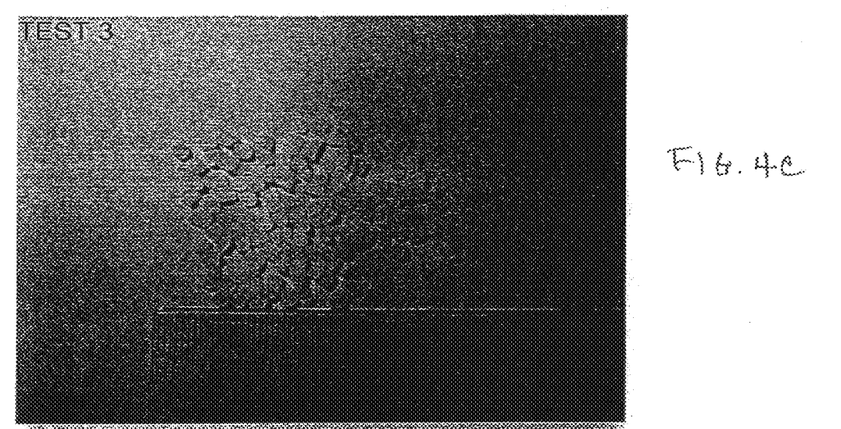
Figure 4D:
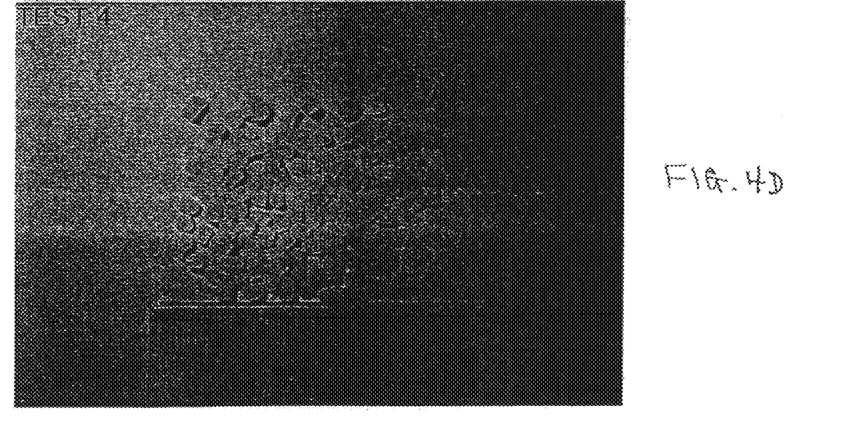
Figure 4E:
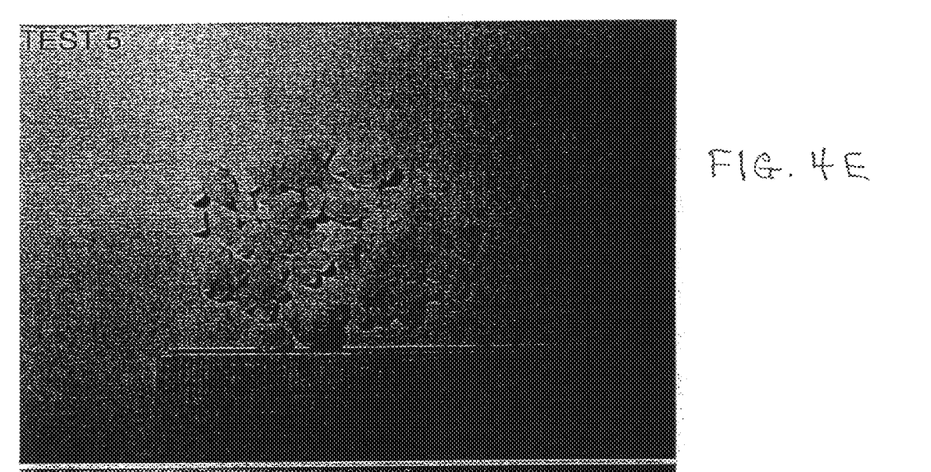
Figure 4F:
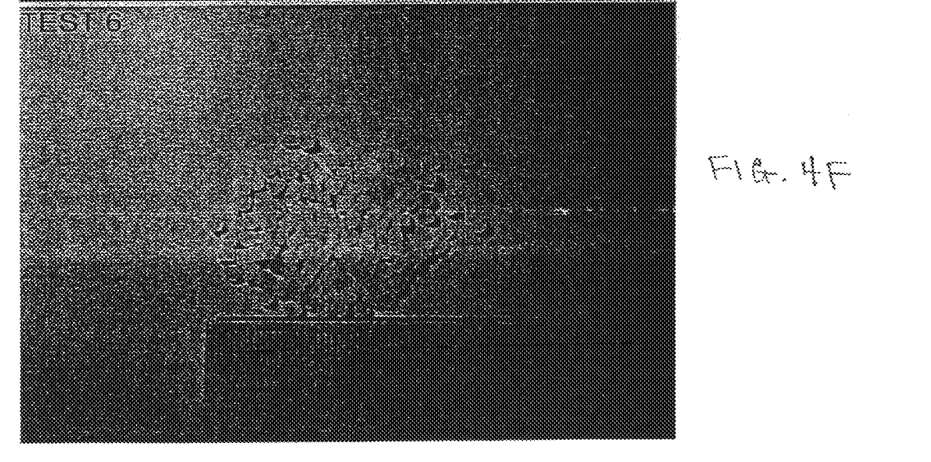
Figure 4G:
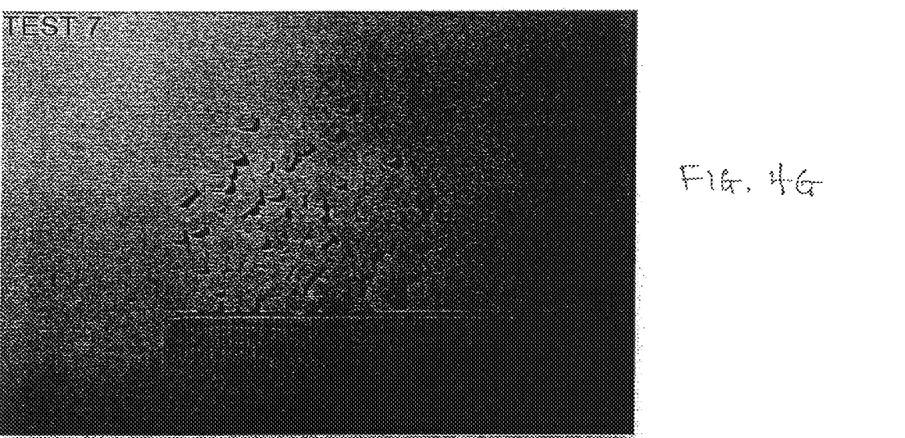
Figure 4H:
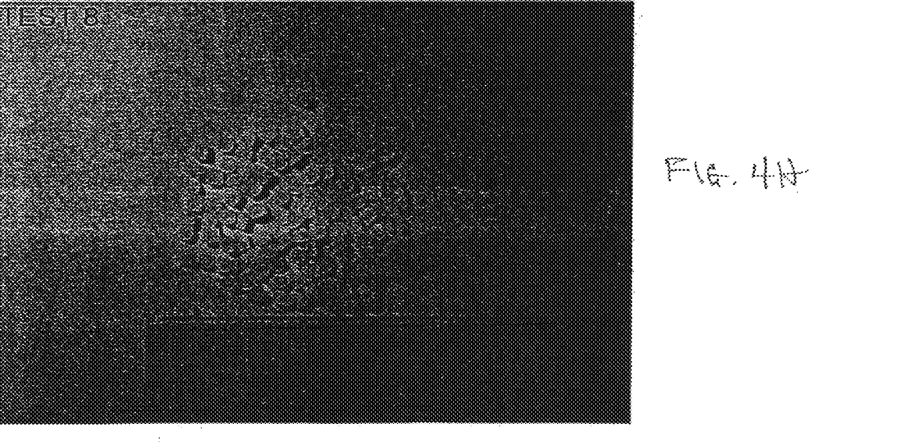

Turning now to FIG. 3, there is pictorially illustrated, equipment used for conducting tests of the apparatus and method of the present invention. The tests were conducted using a polyethylene wax having the following properties:
Softening point—110-120° C.
Density—0.70-0.80 grams/cm3 @ liquid feeding temp. —0.92-0.95 grams/cm3 @45° C. (solid)
Viscosity—5-200 centipoise@ 149° C.

The polyethylene wax was heated in the barrel heater 22 above 120° C. to the density specified above. Once at the desired liquid state, the liquid wax was fed to the heater tap by the liquid pump 26 and into the entrance end of the extruder 28. The extruder 28 was a twin screw type. While in the extruder, the temperature of the polyethylene wax was reduced from above 120° C. at the extruder entrance to about 50° C. at the extruder exit. The cooling was effected by cooling bores in the barrel of the extruder which were supported by the chiller 30. At 50° C. exiting from the extruder, the polyethylene wax was in a solid, malleable state. Upon exiting the extruder, the solid polyethylene wax passed through a pellet diverter valve (PDV) 32 and then into a dry face pelletizer 34 where solid wax strands exiting the die plate orifices were cut by the rotary cutter. The cut pellets were conveyed out of the cutting chamber of the pelletizer 34 by an air stream created by the blower 36 and conveyed to the cyclone 38 and then into a container.

It is also contemplated as a part of the present invention that the cutting chamber of the dry face pelletizer as disclosed herein can be purged and/or the pellets conveyed using an inert gas. Some wax or wax-like materials to be processed in accordance with the present invention can negatively react and/or oxidize (degrade) with exposure to ambient atmosphere. In order to minimize such ambient atmospheric reactions and/or to maintain the desired properties of the materials being pelletized, it is contemplated that an inert gas, instead of air, be used to purge the cutting chamber and convey the formed pellets. The inert gas can also be used to help further cool the pelletized materials, and the equipment immediately following the pelletizing step should be suitably designed to handle and maintain the presence and use of the inert gas until the pellets have been suitably packaged for storage and/or taken further on for subsequent processing.

Polyethylene wax pellets from test runs using the above described equipment and processing are shown in FIGS. 4A-4H. As there illustrated, the apparatus and process of the present invention was successful in producing uniform polyethylene wax pellets having a diameter of about 3 mm.

Waxes, individually or formulationally, which may be processed in accordance with the present invention, include acid waxes, beeswax, candelilla wax, carnauba, ceresin wax, China wax, copolymer waxes, ester waxes, Fischer-Tropsch waxes including oxidized forms, high density low molecular weight polyethylene or HDLMWPE, hydroxystearamide wax, japan wax, lardeceine, lignite wax, linear and branch chained waxes, maleated waxes, montan wax, microcrystalline wax, nonpolar and polar polyethylene, polypropylene and polyolefin waxes, oxidized waxes, ozokerite, paraffin or petroleum wax, polyethylene wax, polyolefin wax, rice bran wax, saponified and partially saponified waxes, substituted amide wax, sugarcane wax, sulfonated waxes, surface modified waxes and vegetable waxes including those from bayberry, canola, coconut, corn, cottonseed, crambe, linseed, palm, palm kernel, peanut, grape or soybean.

Other materials which can be pelletized according to the present invention include, but are not limited to, fatty acids and esters, tackifiers and de-tackifiers, rosins and organic resins, viscosity and rheology modifiers, solid surfactants, water soluble polymers including polyethylene oxide and polypropylene oxide, tallow, lanolin and animal fats.

Still more materials for which the present invention can be useful include, but are not limited to, high melt flow index materials and low molecular weight materials, waxlike organic polymers, oligomers, cyclic polymers and oligomers and organic compounds.

It is believed that the apparatus and process of the present invention produce high quality pellets and micro-pellets suitable for packaging or use as is or to be ground into a fine powder. The present invention can most quickly, safely and efficiently get the wax from its hottest molten state to being cool enough to transport and/or package while doing so in the least amount of space. Furthermore, there is optimum flexibility to process the widest range of wax grades, weights, melt strengths, thermal properties, etc., to produce a very wide variety of pellet sizes and to cover a very broad range of production rates. In addition, the present invention is flexible enough to allow a wide variety of additives to be blended into the wax being pelletized and also allows for relatively easy cleaning of the equipment when switching between products.

It is not intended that the present invention be limited to the specific processes described herein. The foregoing is considered as illustrative only of the principles of the invention.

Further, numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed:

1. A method for pelletizing wax or wax-like materials having a sharp melt point which comprises:
   (a) forming a wax or wax-like material having a sharp melt point into a liquid melt, a temperature of said liquid melt being above a melt point of said wax or wax-like material;
   (b) cooling the liquid melt material using cooling surfaces within a cooling extruder to a temperature below said melt point to cause the wax or wax-like material to change state to be in an extrudable solid condition, said step of cooling including exposing said wax or wax-like material to said extruder cooling surfaces to form cooled layers that are moved away from the extruder cooling surfaces and interspersed with warmer layers of wax or wax-like material into a mixture and then returning the mixture to the cooling surfaces for more heat energy reduction while said wax or wax-like material is in said cooling extruder;
   (c) extruding the mixture of said wax or wax-like material in said solid state through die orifices of a die plate to form strands; and
   (d) cutting the solid extruded strands with a rotary cutter in a cutting chamber absent any liquid to form said wax or wax-like material into pellets.

2. The method of claim 1, wherein said pellets are made to fall by gravity out of a bottom opening of said cutting chamber.

3. The method of claim 2, wherein said pellets exiting said cutting chamber are directed to a conveyor and are transported away by the conveyor to a pellet screener, cooler and/or packaging unit.

4. The method of claim 1, wherein said cutting chamber and said rotary cutter are part of an underwater pelletizer operated without water or other cooling liquid as a dry face pelletizer.

5. The method of claim 1, wherein said wax or wax-like material is selected from the group consisting of acid waxes, beeswax, candelilla wax, carnauba, ceresin wax, China wax, copolymer waxes, ester waxes, Fischer-Tropsch waxes including oxidized forms, high density low molecular weight polyethylene or HDLMWPE, hydroxystearamide wax, japan wax, lardeceine, lignite wax, linear and branch chained waxes, maleated waxes, montan wax, microcrystalline wax, nonpolar and polar polyethylene, polypropylene and polyolefin waxes, oxidized waxes, ozokerite, paraffin or petroleum wax, polyethylene wax, polyolefin wax, rice bran wax, saponified and partially saponified waxes, substituted amide wax, sugarcane wax, sulfonated waxes, surface modified waxes and vegetable waxes including those from bayberry, canola, coconut, corn, cottonseed, crambe, linseed, palm, palm kernel, peanut, grape or soybean.

6. The method of claim 1, wherein step (b) is carried out in two stages; in the first stage, the temperature of the wax or wax-like material is reduced to a temperature just above where the wax or wax-like material will change from a liquid to a solid so that the wax or wax-like material remains liquid enough to have good unobstructed flow and, in the second stage, the temperature of the wax or wax-like material is further reduced so that the wax or wax-like material is a thoroughly mixed extrudable solid material.

7. The method of claim 6, wherein the temperature of the wax or wax-like material in the first stage is reduced to approximately 5° C. or less above said liquid to solid transition temperature of the wax or wax-like material.

8. The method of claim 4, wherein said pellets are removed from said cutting chamber by an inert gas introduced into one side of said cutting chamber which conveys the pellets out of another side of said cutting chamber.

9. The method of claim 6, wherein said first and second stages further comprises the step of raising the temperature of the material being pelletized if said material has lost sufficient malleability for processing.

10. The method of claim 6, wherein said second stage is carried out in a screw-type extruder.

11. The method of claim 4, wherein said dry face pelletizer can be converted to an underwater pelletizer with water and back again to a dry face pelletizer without liquid.

12. The method of claim 10, wherein said screw-type extruder has two or more screws.

13. The method of claim 10, wherein said screw-type extruder is a co-rotating and inter-meshing twin or two screw extruder.

* * * * *